US012761997B2

(12) United States Patent
Nautiyal et al.

(10) Patent No.: US 12,761,997 B2
(45) Date of Patent: Oct. 13, 2026

(54) METHOD AND APPARATUS FOR PERFORMING A FAULT RECOVERY BASED ON AN APPLICATION DEPENDENT FAULT REACTION TIME

(71) Applicant: NXP B.V., Eindhoven (NL)

(72) Inventors: Hemant Nautiyal, Greater Noida (IN); Marcus Mueller, Munich (DE); Sandeep Kumar Arya, Bangalore (IN); David Baca, Munich (DE)

(73) Assignee: NXP B.V., Eindhoven (NL)

( * ) Notice: Subject to any disclaimer, the term of this patent is extended or adjusted under 35 U.S.C. 154(b) by 167 days.

(21) Appl. No.: 18/499,802

(22) Filed: Nov. 1, 2023

(65) Prior Publication Data

US 2025/0086042 A1 Mar. 13, 2025

(30) Foreign Application Priority Data

Sep. 12, 2023 (IN) ............................ 202341061442

(51) Int. Cl.
*G06F 11/00* (2006.01)
*G06F 11/07* (2006.01)

(52) U.S. Cl.
CPC ...... *G06F 11/0772* (2013.01); *G06F 11/0793* (2013.01)

(58) Field of Classification Search
CPC ............. G06F 11/0751; G06F 11/0757; G06F 11/0772; G06F 11/079; G06F 11/0793
See application file for complete search history.

(56) References Cited

U.S. PATENT DOCUMENTS

| | | | | |
|---|---|---|---|---|
| 9,952,922 | B2 * | 4/2018 | Edmiston | G06F 11/0751 |
| 10,592,322 | B1 | 3/2020 | Seshadri | |
| 11,334,409 | B2 | 5/2022 | Nautiyi | |
| 2019/0050515 | A1 * | 2/2019 | Su | G06N 3/045 |
| 2021/0397502 | A1 | 12/2021 | Nautiyal et al. | |
| 2022/0121512 | A1 | 4/2022 | Srivastava | |
| 2023/0027878 | A1 | 1/2023 | Srivastava | |
| 2023/0031600 | A1 * | 2/2023 | Monroe | G06F 11/3055 |
| 2024/0140489 | A1 * | 5/2024 | Min | B60W 50/029 |

OTHER PUBLICATIONS

Steffen Becker Jan et al: “Providing Evidence for Correct and Timely Functioning of Software Safety Mechanisms1”, Software Engineering 2023 Workshops, Feb. 1, 2023, pp. 1-12.

* cited by examiner

*Primary Examiner* — Charles Ehne

(57) ABSTRACT

A fault reaction handling time interval (FRTI) for a reaction to the fault is determined based on a domain identifier (DID) indicative of an application associated with a fault. A first reaction to recover from the fault is signaled and then a determination is made whether a safe state is reached after the FRTI. Based on the safe state not being reached, a second FRTI is determined for a second escalated reaction, the second FRTI also being based on the DID. Typically, the second reaction results in less system availability so by defining the FRTI based on the DID sufficient time is allowed for reaching a safe state before the reaction is escalated.

14 Claims, 5 Drawing Sheets

METHOD AND APPARATUS FOR PERFORMING A FAULT RECOVERY BASED ON AN APPLICATION DEPENDENT FAULT REACTION TIME

CROSS-REFERENCE TO RELATED APPLICATIONS

This application claims the priority under 35 U.S.C. § 119 of India patent application no. 202341061442, filed on 12 Sep. 2023, the contents of which are incorporated by reference herein.

FIELD OF USE

This disclosure generally relates to fault recovery, and more particularly to performing fault recovery for an application executed by an electronic system based on an application dependent fault reaction time.

BACKGROUND

An electronic system which executes an application on a processing core typically use resources such as memory, sensors, or timers to facilitate execution of the application. The electronic system has explicit safety requirements. For example, if a fault is detected in the processing core or resource, fault recovery is performed. Typically, a time to perform the fault recovery defined by a Fault Handling Time Interval (FHTI) includes a fault detection time interval (FDTI) which is a time interval for the fault to be detected and fault reaction time (FRTI) which is a time interval for performing the fault recovery. At the end of the FHTI, one or more of the application, the processing core, the resource, or the system should have reached a safe state where operation is restored in accordance with the fault with reasonable safety.

Figure 1:
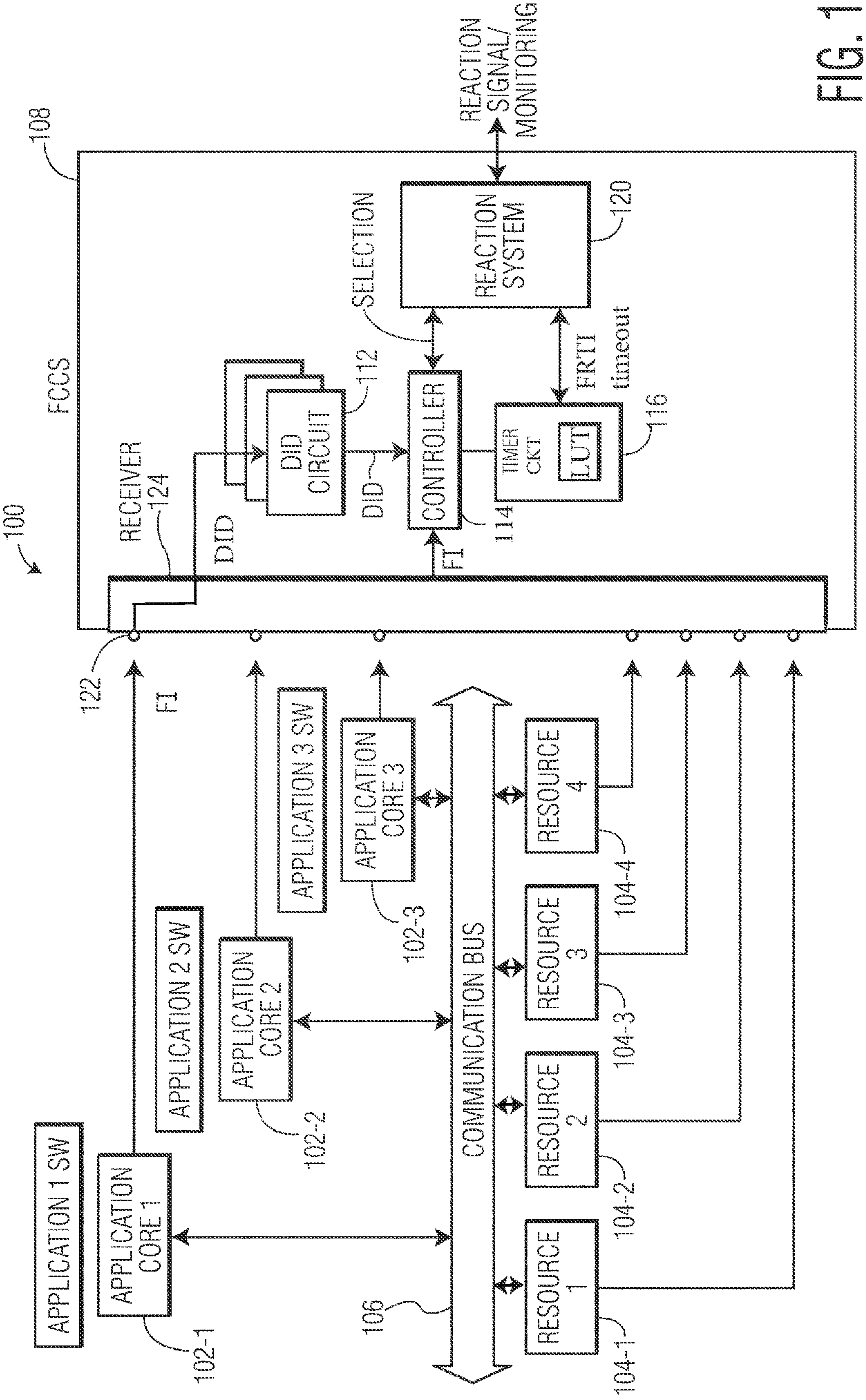
FIG. 1 illustrates an example block diagram of a system arranged with fault recovery in accordance with an embodiment.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to application-based fault reaction time management to increase system availability. A fault source provides a fault indication to a fault collection and control system (FCCS) which causes a reaction to be performed based on the fault. In examples, a fault reaction time interval (FRTI) is based on an application which caused the fault in the fault source. To determine the FRTI, the FCCS determines a domain identifier (DID) indicative of the application which caused the fault. The DID is provided by the fault source or determined by a DID circuit in the FCCS based on a preconfigured DID in the DID circuit. A timer circuit of the FCCS receives this DID and selects an appropriate FRTI based on the DID. A fault recovery is performed. The fault recovery includes performing a reaction to the fault and one or more of the application, an application core which executes the application, a resource used by the application core, or system reaching a safe state. The safe state is a state in which one or more of the application, an application core, a resource, execution environment, or system operate in accordance with the fault with reasonable safety. If a safe state is reached, then safe operation is reached and the fault recovery is successful. If a safe state is not reached, then safe operation is not restored and the fault recovery is not successful. The reaction is escalated. The FCCS determines an updated FRTI associated with the escalation and fault recovery is performed based on the updated FRTI and escalated reaction. Typically, the escalated reaction results in less system availability so by defining the FRTI based on the DID sufficient time is allowed for fault recovery before the reaction is escalated resulting in overall more system availability. Well known instructions, protocols, structures, and techniques have not been shown in detail in order not to obfuscate the description.

Example Systems

FIG. 1 illustrates an example block diagram of a system 100 arranged with fault recovery in accordance with an embodiment. The fault recovery in the system 100 includes performing a reaction to the fault and reaching a safe state as described herein. In an example, the system 100 may be a subsystem of an electronic system such as an automotive system, an aircraft guidance system, a home security system, among other systems and components implemented with circuitry such as one or more of analog circuitry, mix signal circuitry, memory circuitry, logic circuitry, and processing circuitry that executes code stored in a memory that when executed by the processing circuitry performs the disclosed functions, among other implementations, on a system on a chip (SoC).

The system 100 may have application cores 102 which use respective resources 104 to execute a respective application. The application cores 102 are identified as 102-1 to **102-*n* where n=3 in this example and the resources are identified as 104-1 to 104-*m* where m=4 in this example, but the system 100 may have fewer or more application cores or resources. The application core 102 may be a processing core such as a central processing unit, processor, microprocessor and the resource 104 may be hardware used by the application core 102 to execute an application such as associated with an electronic control, clock monitor, watchdog circuit, direct memory access (DMA) circuit, memory, memory controller, input/output controller, accelerator, sensor, camera etc. In an example, application core 102-1 may execute application software_1, application core 102-2 may execute application software_2, and application core 102-3 may execute application software_3. The application cores 102 may access the resources 104 to execute the application via a communication bus 106. A number of application cores 102 and resources 104 may be the same (m=n) or different (m/=n) in which case resources 104 may be shared between application cores 102. In an example, the application core 102-1 in a vehicle may use resources 104-1 and 104-2 associated with subsystem A such as a braking system in the vehicle and application core 102-2 and application core 102-3 may use resources 104-3 and 104-4 associated with subsystem B which may be a steering system in the vehicle. The described sharing of the resources 104 by the application core 102 is exemplary in nature and the application cores 102 may use resources 104** in different ways depending on the application.

A group of one or more applications, one or more application cores 102 and one or more resources 104 that provide a service may define an execution environment (or cohort). In an example, when the system 100 is located in a vehicle, the service may be vehicle dynamics processing or advanced driver assistance. The vehicle may have a plurality of execution environments or cohorts in an example which use the functions of the application cores 102 and associated resources 104.

The system 100 may generate a fault. The fault is an error or abnormal condition in the system 100 and may occur in an application, application core executing the application, or a resource used by the application. The fault may be in hardware, software, or a combination of hardware and software. As an example, the resource may be a counter used by an application to count events and if there is a fault which prevents the counter from counting events, the counter may generate a fault indication and be a fault source. As another example, the resource may be a transmitter used by an application and the transmitter which has an error in a transmit path is a fault source. As yet another example, the resource may be a memory used by an application and when the memory has a fault detected by an error checking code the memory may generate a fault indication and be a fault source. The fault may also occur based on a failure of one of the plurality of transactions between the plurality application cores and the plurality of resources. For example, a fault may occur based on a failure of a first transaction performed between the first application core 102-1 and the first resource 104-1 for executing the application 1. In yet another example, a fault may occur based on a failure of an operation of one of the plurality of resources 104 subsequent to a transaction. For example, a fault may occur based on a failure of an operation of the first resource 104-1 subsequent to the first transaction. A fault indication (FI) may be provided from a fault source to a fault collection and control system (FCCS) 108 over a fault channel in response to the fault and which generates a reaction to the fault so that the system 100 is able to recover from the fault. The fault indication FI is an information message which includes information pertaining to the fault such as, but not limited to, a type of fault, a time at which that the fault had occurred, and various other parameters required to characterize or reproduce one or more fault conditions.

The FCCS 108 may have a receiver 124 and a reaction system 120 in an example. The receiver 124 may receive the fault indication on a port 122 of the FCCS 108 represented by circles 122. Based on the fault indication, a controller 114 may perform a fault recovery. The fault recovery includes causing the reaction system 120 to perform a reaction associated with fault recovery. In an example, the reaction of the reaction system 120 may cause a software reset of the application of the application core which uses the fault source as a resource. The software reset may terminate an application (e.g., software) executing on the application core 102 which caused the fault in the resource and clear any data in memory associated with the application which caused the fault. In another example, the reaction of the reaction system 120 may cause a hardware reset of the application core 102. The hardware reset may clear the application and all configuration parameters from the application core 102 and boot the application core 102 to reload the application and configuration parameters. Other reactions are also possible such as sending an interrupt signal to the application core 102 to cause the application core 102 to attempt to rectify the fault without performing a reset. In some examples, the reaction system 120 may cause a hardware reset of the system 100 when earlier software reset attempts fail and as a result the application cores 102 and resources 104 may also be hardware reset. In an example, the reaction system 120 may output a reaction signal which is provided to a fault recovery system (not shown) or fault handling system (not shown) to perform the specified reaction. The fault recovery also includes reaching a safe state. The safe state is a state in which one or more of the application, an application core, a resource, execution environment, or system operate in accordance with the fault with reasonable safety.

The services provided by the execution environment in the system 100 typically have explicit safety requirements. For example, a fault in a resource used by the application core needs to be detected and fault recovered in a Fault Handling Time Interval (FHTI) defined by a fault detection time interval (FDTI) and a fault reaction time interval (FRTI). The FDTI is a time interval for the fault to be detected and FRTI is a time interval a time to recover from the fault which includes reaching a safe state. The fault recovery includes performing a reaction to the fault and reaching the safe state.

Embodiments disclosed herein are directed to defining the FRTI based on the application associated with the fault rather than defining a fixed or constant timer value which indicates a FRTI regardless of the application associated with a fault. The FCCS 108 may have a plurality of domain identifier (DID) circuits, an example of which is DID circuit 112, which are coupled to the receiver 124 and the controller 114. The DID circuit 112 may provide a DID indicative of an application which caused a fault to the controller 114. Further, the FCCS 108 may have a timer circuit 116. The DID circuit 112 and the timer circuit 116 may facilitate determination of the FHTI based on the application associated with the fault.

In an example, the fault collection and reaction system 108 may be configured to receive an indication of an application associated with the fault. For example, the receiver 116 may receive first domain identifier DID1 when the fault is associated with the application 1. Each DID circuit 112 may be associated with a respective port of the FCCS 108 and which is coupled to a fault channel and a fault source. The DID circuit 112 coupled to the port 122 may receive this DID and then provide the DID to the controller 114. Some fault sources may be arranged to provide a DID associated with a fault while other fault sources may not be arranged to provide a DID associated with a fault. If the DID is received from the fault source, then the DID circuit 112 may output the DID to the controller 114. If the DID is not received from the fault source, then the DID circuit 112 may output the DID to the controller 114 based on a preconfigured DID associated with the port which the DID circuit 112 is coupled to. The preconfigured DID may be stored in the DID circuit 112 for the port to which the DID circuit 112 is coupled and configured during an initialization process. The controller 114 may provide the DID to the timer circuit 116 and based on a look up table (LUT) in the timer circuit 116 the timer circuit 116 may determine a FRTI associated with the DID. In some examples, the LUT may be configured based on a selected reaction to be performed in response to the fault. The FRTI may vary depending on the DID associated with the fault. For example, DID1 of application_1 may require a FRTI which is less than an FRTI for DID2 of application_2. The controller 114 may provide an indication to the reaction system 120 of the selected reaction to be performed which then causes a reaction signal associated with fault recovery to be sent to the fault handing system or fault recovery system to cause a reaction. Further, the timer circuit 116 may establish a timer which is set to expire after a time defined by the FRTI. The timer is started and the timer circuit 116 provides an FRTI timeout signal to the reaction system 120 when the timer expires. The reaction system 120 may monitor whether the fault handing system or fault recovery system indicates that a safe state of one or more of the application, an application core, a resource, execution environment, or system is reached when the timer expires and provides a corresponding signal to the controller 114. If a safe state is not reached when the FRTI timeout signal is received by the reaction system 120, the controller 114 may cause the reaction system 120 to perform a different reaction to the fault and set the timer with another FHTI of an LUT based on the DID. In some examples, the LUT may be configured based on the different reaction. By defining the FRTI based on the DID, a system availability (e.g., to a user or higher system) is overall longer than if a fixed FRTI is applied for all of the applications associated with faults. Sufficient time may be allocated to reach a safe state before another reaction selection is provided to the reaction system 120 which may result in a more severe reaction and increased chances that the system may become unavailable for a longer duration based on the more severe reaction.

Figure 2:
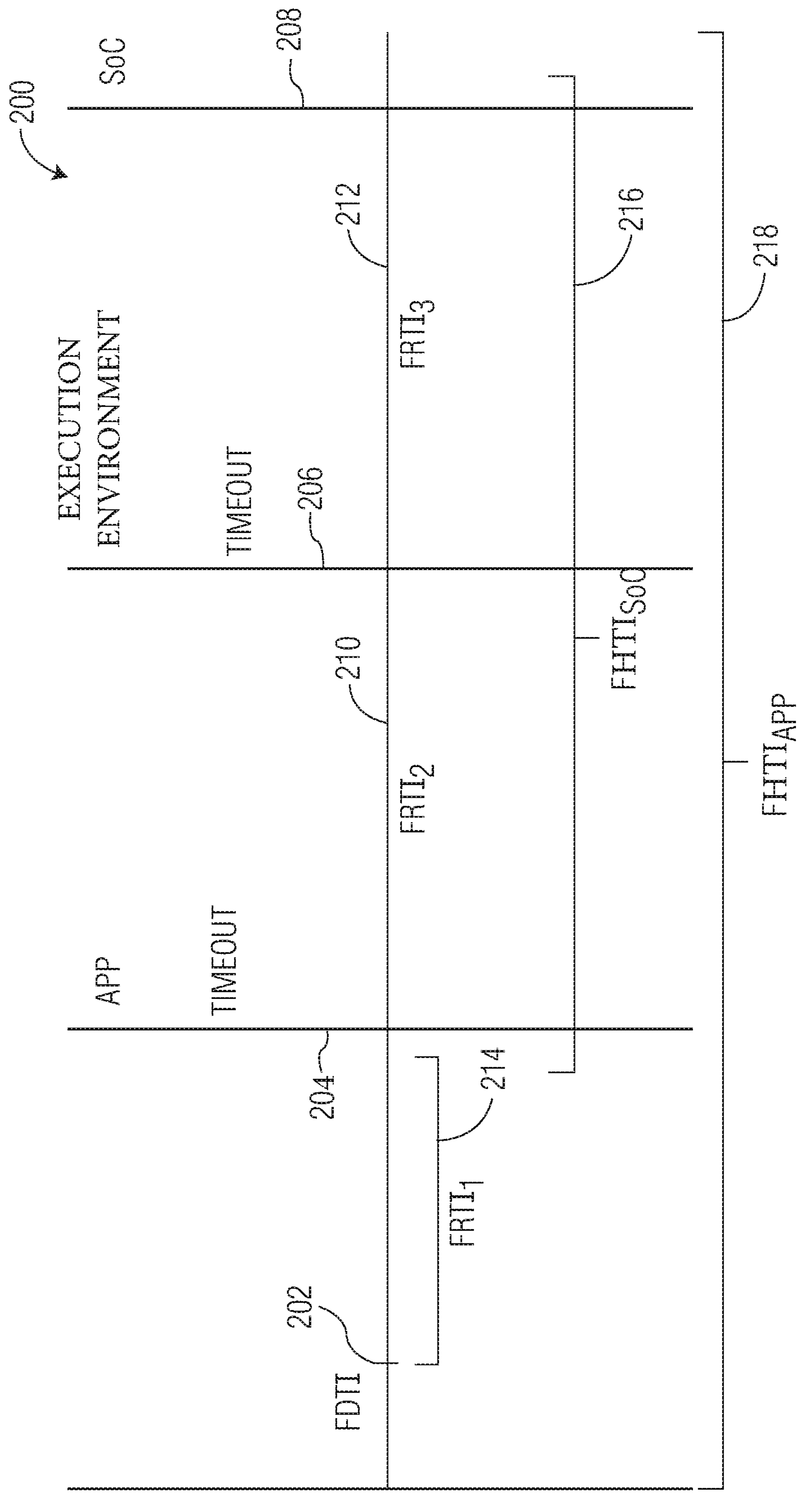
FIG. 2 is an example timing diagram associated with fault recovery in accordance with an embodiment.

FIG. 2 is an example timing diagram 200 associated with fault recovery in accordance with an embodiment. The fault recovery may include reaching a safe state at an end of the FHTI. The FHTI may be defined by one or more of an FDTI and one or more FRTI. A duration of the FHTI may depend on a number of reactions that are performed in response to a fault and corresponding FRTI time intervals waited to see if a safe state is reached. Further, a duration of the FRTI may be set based on the DID which generated the fault rather than conventionally setting the FRTI to the fixed time. In an example, the duration of the FRTI may be longer if an application can tolerate a fault condition for a longer time to reach the safe state and the duration of the FRTI may be shorter if an application can tolerate a shorter time to reach the safe state. This way enough time is allocated to the FRTI of an application to reach a safe state before a more severe reaction is taken where the system may be unavailable for an extended time. In some examples, safety critical applications may be associated with a shorter FHTI so that a safe state is reached quickly by sacrificing system availability.

The example timing diagram 200 shows FDTI 202 when a fault is detected followed by a plurality of different reactions, shown as a first level reaction, a second level reaction, and a third level reaction. The first level reaction is performed during the first fault reaction time interval 214. The first level reaction may be a software reset of the application running on the application core and/or hardware reset of an application core or resource used by the application in an example. If one or more of the application, application core, resource, execution environment, or SoC is not in a safe state by a time out at 204 received by the reaction system 120, then a more severe second level reaction may be performed in a second fault reaction time interval 210. The second level reaction may be a hardware reset of an execution environment as an example. If one or more of the application, application core, resource, execution environment is not in a safe state by a timeout 206, then an even more severe third level reaction may be performed which may include reset of the system 100 itself or stop of external communications by the system 100. The more severe reaction may be performed in a third fault reaction time interval 212. The third level reaction may be a hardware reset of the SoC and the SoC is placed in an SoC safe state at 208, as an example. The second fault reaction time interval 210 and the third fault reaction time interval 212 may define an SoC fault handling time interval 216 and the first fault reaction time interval 214, the second fault reaction time interval 210, the third fault reaction time interval 212, and the fault detection time interval 210 may define an application fault handling time interval 218 which indicates a time to reach the safe state. The example timing diagram 200 illustrates three levels of fault reaction but the system 100 may include fewer or more levels of different fault handling time intervals depending on how long it takes before a safe state is reached for different reactions.

Figure 3:
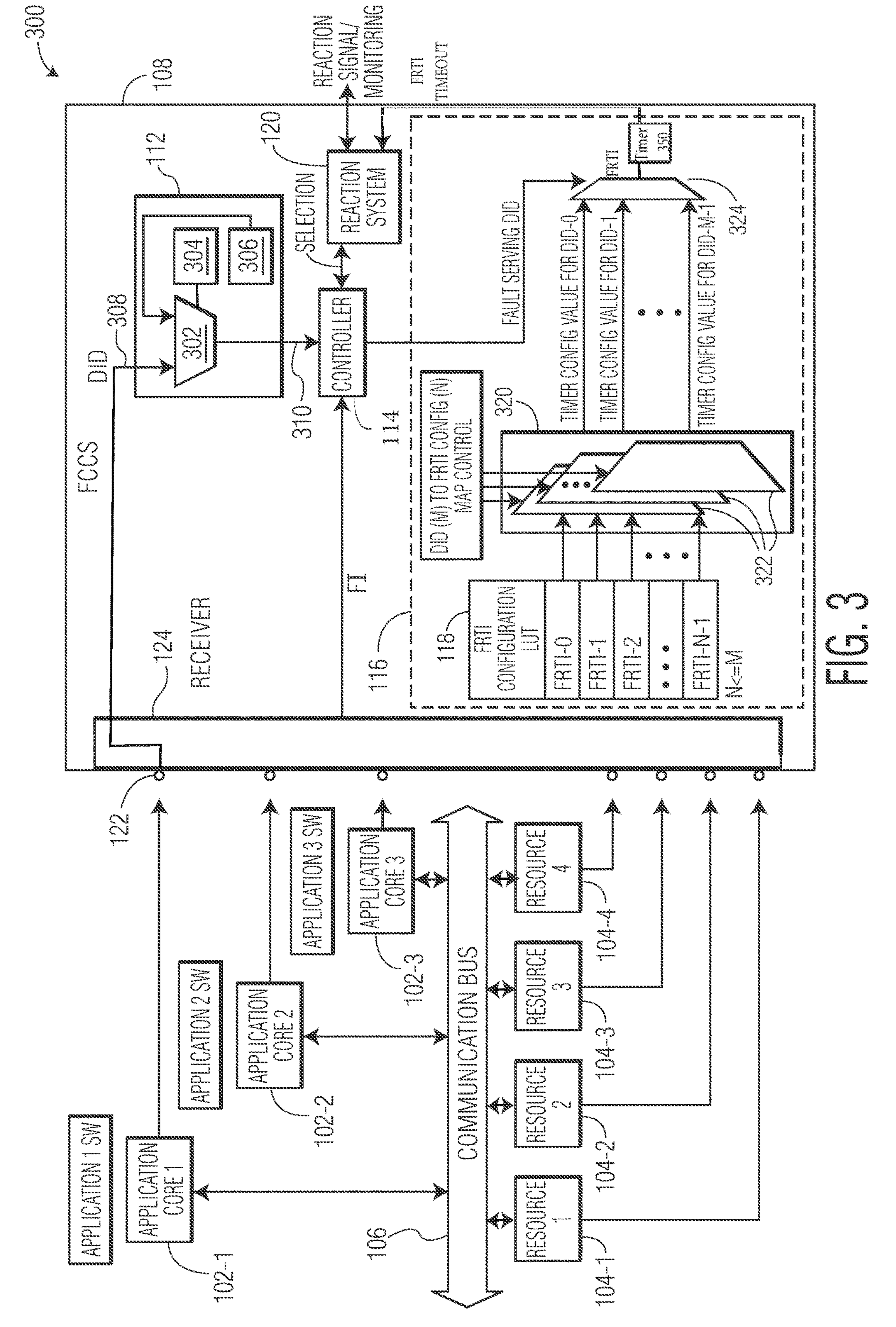
FIG. 3 illustrates an example implementation of a domain identifier (DID) circuit and timer of the system in accordance with an embodiment.

FIG. 3 illustrates an example implementation of the DID circuit 112 and timer 116 of the system 100 in more detail in accordance with an embodiment.

In an example, the DID circuit 112 may have a DID input 308 and a DID output 310. The DID input 308 may receive the DID from the receiver 124 when the fault source provides the DID and the DID output 310 may be an indication of the DID which is provided to the controller 114. Further, the DID circuit 116 may include a multiplexer 302, a multiplexer control 304, and memory 306. In some examples, the fault source may provide the DID associated with the application which caused the fault on the DID input 308 but in other examples, the fault source may not provide the DID which caused the fault on the DID input 308. The DID might not be provided because the fault source does not support a capability to provide the DID. In an example, the memory 306 of the DID circuit 112 may be preconfigured with an indication of the DID which is set based on a port which the DID circuit 112 is coupled and corresponds to an application associated with the fault. The DID input 308 may be coupled to the multiplexer 302. The multiplexer control 304 may be arranged to cause the DID from a fault source or DID from the memory 306 to be output by the DID circuit 116 depending on whether the DID is or is not provided by the fault source. The multiplexer control 304 arrangement may be configured by a user during a configuration process. If a DID is not provided by the fault source, then the multiplexer control 304 may signal the multiplexer 302 to output the DID stored in the memory 306. If DID is provided by the fault source, the multiplexer control 304 may signal the multiplexer 302 to output the DID from the fault source. The DID from the fault source or the memory 304 may be provided to the DID output 310 and controller 114. In this way, the controller 114 may receive an indication of the DID associated with a fault regardless of whether the fault source provides the DID itself.

In an example, the timer circuit 116 may have a FRTI look up table (LUT) 118, a mapping control 320, and a multiplexer 324. The FRTI LUT 118 may define a plurality of FRTI which are possible reaction time intervals for a particular reaction to a fault associated with a DID. In an example, a number of different reaction time intervals N may be less than or equal to the number of DIDs M in the FRTI LUT 118 such that in some examples different DIDs may share a same reaction time. The mapping control 320 may include a plurality of mapping multiplexers 322 where each mapping multiplexer 322 may be associated with a particular DID. A mapping multiplexer 322 may receive the reaction times from the FRTI LUT 118 and output one of the reaction time interval from the FRTI LUT 118 associated with a corresponding DID. Each mapping multiplexer 322 may be configured to output a respective FRTI. The multiplexer 324 may receive the DID from the DID circuit 112 output the FRTI of the DID indicated by the mapping control 320 which is then provided to the timer 350. The timer 350 may be set based on the FRTI output by the multiplexer 324 and started when the reaction signal is provided to a fault handling system or fault recovery system which performs the fault recovery including fault recovery or transition to a safe state. The timer 350 may provide an FRTI timeout signal to the reaction system 120 at expiry of the timer 350. The expiration of the timer 350 indicates a passing of time equal to the FRTI and which causes the reaction system 120 to determine whether a safe state is reached by an application, application core, resource, execution environment, or SoC based on the reaction.

In some examples, the system 100 may have a plurality of instances of the FRTI LUT 118. Each instance may be associated with a reaction that is performed and define reaction times for the reaction. For example, if the reaction is a software reset of an application, the timer circuit 116 may use one table to the determine the FRTI for the DID while if the reaction is a hardware reset of an application core which is more severe than the software reset then another table may be used to the determine the FRTI for the DID. Based on the severity of the reaction, the FRTI in the FRTI LUT 118 may be different and the FRTI for the DID selected by the mapping control 320 and mapping multiplexer 322 may be different. Different lookup tables may be used as input to the mapping control 320 to provide the respective reaction time depending on the severity of the reaction.

Figure 4:
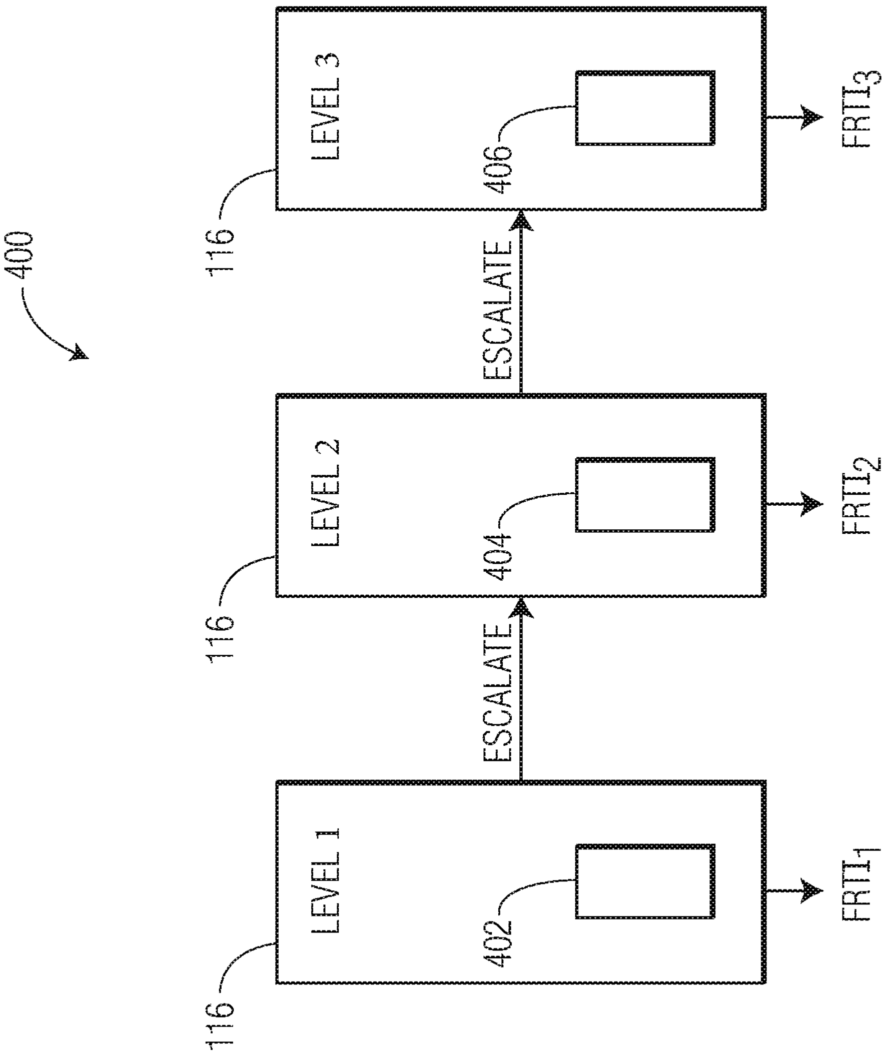
FIG. 4 illustrates an example hierarchy of lookup tables used by the timer to determine a reaction time interval to react to a fault in accordance with an embodiment.

FIG. 4 illustrates an example hierarchy 400 of FRTI LUTs 402-406 used by the timer 116 to determine a fault reaction time interval of a fault in accordance with an embodiment. The table 402-406 which is used may depend on a severity of the reaction that is selected by the controller 114. The severity of the reaction may be identified as a level_1, a level_2, and a level_3 reaction where a lower level reaction may result in more system availability compared to a higher level reaction. To illustrate, in response to a fault, the timer 116 may use a level_1 FRTI LUT 402 to determine a FRTI1 which is provided to the reaction system 120. If the reaction system 120 determines that a safe state is not reached in the FRTI1, then a reaction is escalated to a level_2 reaction and the timer 116 may use a level_2 FRTI table 404 to determine a FRTI2 which is provided to the reaction system 120. Further, if the reaction system 120 determines that a safe state is not reached in the FRTI3, then a reaction is escalated to a level_3 reaction and the timer 116 may use a level_3 FRTI LUT 406 to determine a FRTI2 which is provided to the reaction system 120. This process may be repeated one or more times until a safe state is reached and the FRTI table may be configured with a different FRTI for each level so that a respective FRTI is selected for the DID. In some examples, the timer 116 may have a single FRTI LUT rather than a plurality of tables. A different mapping control 320 may be used depending on a severity of a reaction such that different FRTI may be selected from the table by a mapping multiplexer 322 based on the severity of the reaction. Other variations are also possible.

Figure 5:
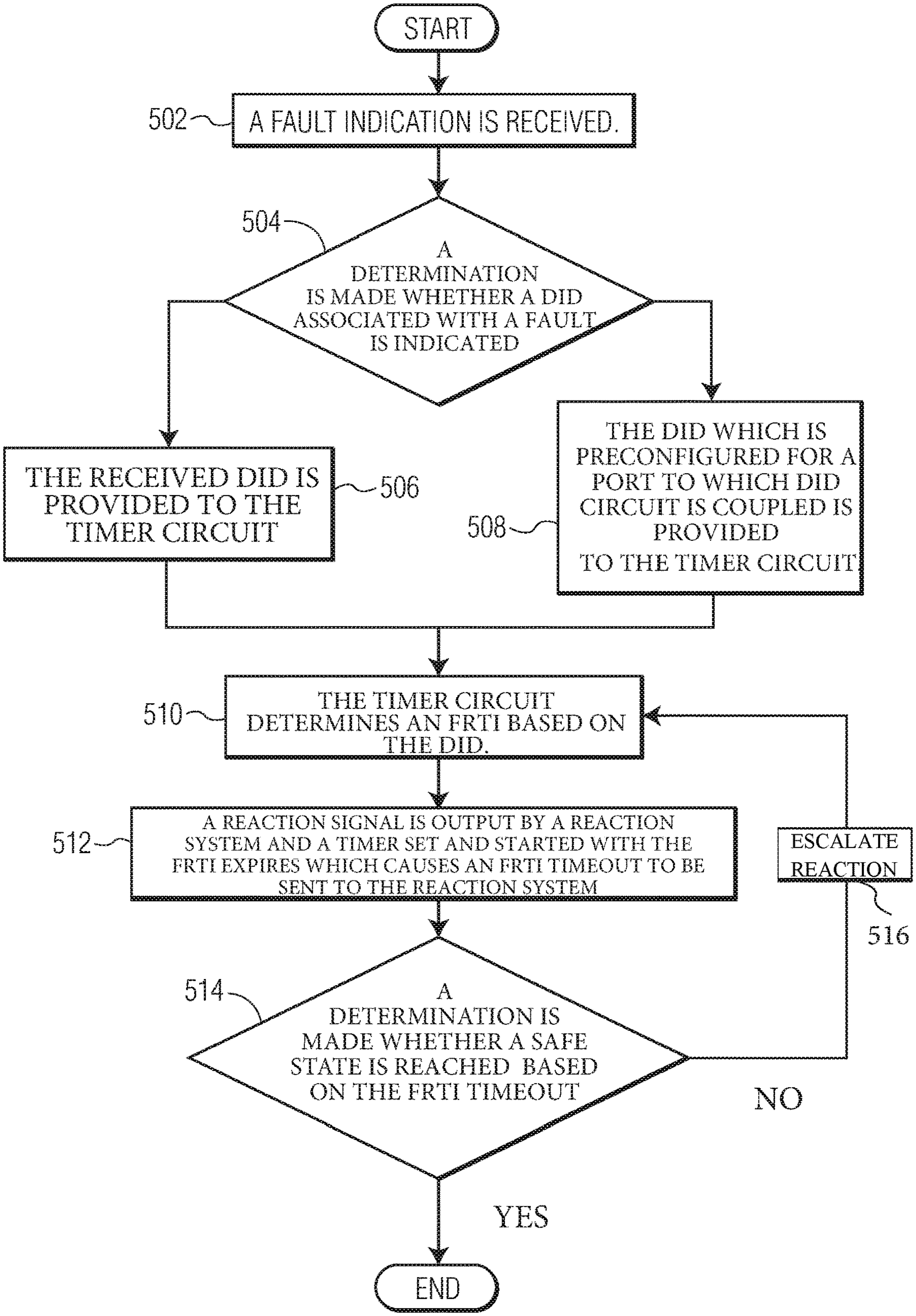
FIG. 5 is a flow chart of functions associated with fault recovery in accordance with an embodiment.

FIG. 5 is a flow chart of functions 500 associated with fault recovery in accordance with an embodiment. At 502, a fault indication is received. The fault indication may be received from fault source such as an application core or resource in an example. The fault indication may identify a fault. At 504, a determination is made whether the DID associated with a fault is indicated. In an example, a DID circuit may have a multiplexer control which is configured to indicate whether the DID is provided by the fault source. The multiplexer control may then cause the DID circuit to output the DID if the DID is provided by the fault source or output a preconfigured DID. If a DID is provided by the fault source, then at 506 the received DID is provided to a timer circuit while if a DID is not provided by the fault source, then at 508 the DID which is preconfigured for a port to which the DID circuit is coupled is provided to the timer circuit. At 510, the timer circuit determines an FRTI based on the DID. In an example, the FRTI may be indicted by an FRTI table and the FRTI may be selected from the FRTI table based on the DID. In an example, the FRTI may also be based on a determined reaction to the fault. At 512, the reaction system outputs a reaction to a fault handling system or fault recovery system and a timer set with the FRTI is started and then expires which causes an FRTI timeout signal to be provided to the reaction system. In an example, the timer is set with the FRTI and started when the reaction signal is provided to the fault source. When the timer expires which indicates passing of time indicated by the FRTI, the FRTI timeout signal is provided to the reaction system. At 514, the reaction system determines whether a safe state is reached based on the FRTI timeout signal. In an example, the fault handing system or fault recovery system may indicate whether a safe state is reached when an indication indicates that one or more of the application, an application core, a resource, execution environment, or system operates in accordance with the fault with reasonable safety. Based on the determination, the reaction system may provide a signal to the controller. If the signal indicates that a safe state is reached, processing terminates. If the signal indicates that the safe state is not reached, then the reaction system causes the controller to escalates a reaction severity. The controller may determine at 516 the escalated reaction based on the DID associated with the fault. Processing also returns to 510 to determine an FRTI of the DID for the escalated reaction. The controller may cause the timer circuit to determine the FRTI of the DID for the increased severity of the reaction and cause the reaction system to provide an escalated reaction to the fault handler or fault recovery system. Advantageously, the FCCS 108 is able to use a FRTI depending on the DID associated with the fault which allows more system availability. In the case that a DID is not associated with a fault, DID circuitry associate the fault with a preconfigured DID so that the FRTI continues to be determined based on the DID. In an example, multiple DID may be mapped to same FRTI by a mapping process and the FRTI may vary depending also on a reaction to a fault.

In an embodiment, a method is disclosed. The method comprises: receiving a domain identifier (DID) indicative of an application which caused a fault in a fault source; based on a DID, determining a fault reaction handling time interval (FRTI) for a reaction to the fault; providing a reaction signal associated with the fault; determining whether a safe state is reached based on the reaction signal after the FRTI; and providing an indication of whether the safe state is reached based on the determination. In an example, determining the FRTI comprises selecting based on the DID the FRTI from a lookup table which comprise a plurality of FRTI. In example, receiving the DID comprises determining that the DID is not provided by the fault source and receiving a preconfigured DID of a DID circuit based on a port to which the DID circuit is coupled, the port coupled to a fault channel of the fault source. In an example, the FRTI is a first FRTI and the reaction is a first reaction; wherein determining whether the safe state is reached comprises determining whether the safe state is reached after the FRTI; and wherein providing an indication comprises based on the safe state not being reached, signaling a second reaction associated with the fault recovery different from the first reaction. In an example, the method further comprises selecting a second FRTI from another lookup table which comprise a plurality of FRTI associated with the second reaction based on the DID. In an example, the second reaction is more severe than the first reaction. In an example, the first reaction is a software reset and the second reaction is a hardware reset. In an example, determining the FRTI comprises determining a respective FRTI from a plurality of FRTI in a look up table for each DID of a plurality of DID; and selecting from the determined FRTI and the respective DID, the FRTI for the DID. In an example, the fault source is one of an application, an application core, a resource, execution environment, or system on a chip and the safe state is a safe operation the application, application core, resource, execution environment, or system on a chip (SoC).

In another embodiment, a fault collection and control system (FCCS) is disclosed. The FCCS comprises: a reaction system; a controller; a domain identifier (DID) circuit arranged to output a domain identifier (DID) indicative of an application which caused a fault in a fault source; a timer circuit arranged to determine based on the DID a fault reaction handling time interval (FRTI) for a reaction to the fault; the controller arranged to indicate to the reaction system a reaction associated with the fault; and the reaction system arranged to provide a reaction signal associated with the fault recovery; determine whether the fault is recovered based on the reaction signal and after an FRTI timeout is indicated by the timer circuit; and provide an indication of whether the safe state is reached based on the determination. In an example, the timer circuit arranged to determine the DID from the fault indication comprises the timer circuit arranged to determine that the DID is not provided by a fault source and receiving a preconfigured DID of a DID circuit based on a port to which the DID circuit is coupled, the port coupled to a fault channel of the fault source. In an example, the timer circuit arranged to determine the FRTI comprises the timer circuit arranged to select based on the DID the FRTI from a lookup table which comprise a plurality of FRTIs. In an example, the FRTI is a first FRTI and the reaction is a first reaction; wherein the reaction system arranged to determine whether the fault is recovered or safe state is reached comprises the reaction system arranged to determine whether the safe state is reached or the fault recovered after the FRTI; and wherein the reaction system arranged to provide an indication of a result of the fault recovery comprises the reaction system arranged to based on the safe state not being reached, signal a second reaction associated with the fault recovery different from the first reaction. In an example, the timer circuit is further arranged to select based on the DID a second FRTI from another lookup table which comprise a plurality of FRTIs associated with the second reaction. In an example, the second reaction is more severe than the first reaction. In an example, the first reaction is a software reset and the second reaction is a hardware reset. In an example, the timer circuit arranged to determine the FRTI comprises the timer circuit arranged to determine a respective FRTI from a plurality of FRTIs in a look up table for each DID of a plurality of DID; and select from the determined FRTI and respective DID, the FRTI for the DID. In an example, the fault source is one of an application, an application core, a resource, execution environment, or system on a chip and the safe state is a safe operation the application, application core, resource, execution environment, or system on a chip (SoC). In an example, the FCCS comprises a plurality of DID circuits and each DID circuit is coupled to a respective port of the FCCS which provides a respective DID for a respective fault source and stores a preconfigured DID for the respective port. In an example, the FRTI for one DID is different for another DID.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method performed by a fault collection and control system (FCCS) of a system on a chip (SoC), the method comprising:

receiving a domain identifier (DID) indicative of an application which caused a fault in a fault source of the SoC, the application executed by an application core of the SoC, the DID received from a DID circuit of the FCCS;

determining, by a timer circuit of the FCCS, a fault reaction handling time interval (FRTI) for a reaction to the fault, the FRTI being based on the DID, wherein the DID is provided to a multiplexer which receives from a mapping multiplexer selected by a mapping control circuit a plurality of FRTI corresponding to different DID, the plurality of FRTI associated with the reaction, and which outputs to a timer of the timer circuit the FRTI based on the provided DID;

providing, by a reaction system of the FCCS, a reaction signal associated with the fault;

determining, by the FCCS, whether a safe state of the fault source is reached based on the reaction signal after the timer indicates the FRTI has passed; and providing an indication to a controller of the FCCS whether the safe state is reached based on the determination;

wherein the FRTI is a first FRTI and the reaction is a first reaction; wherein determining whether the safe state is reached comprises determining whether the safe state is reached after the first FRTI; wherein providing the indication comprises based on the safe state not being reached after the first FRTI, causing by the mapping control circuit the multiplexer to receive another plurality of FRTI corresponding to the different DID, the other plurality of FRTI associated with a second reaction; selecting by the multiplexer a second FRTI from a plurality of FRTI associated with the second reaction based on the provided DID and which outputs to the timer the second FRTI of the DID; signaling a second reaction associated with the fault recovery different from the first reaction and determining whether the fault is recovered after a timeout of the second FRTI is indicated by the timer of the timer circuit, wherein the first FRTI and the second FRTI are configured to reduce a time that the fault source reaches the safe state after the fault increasing functionality of the fault source after the fault compared to when the first FRTI and second FRTI do not change for different reactions; and wherein the second reaction is more severe than the first reaction.

2. The method of claim 1, wherein determining the first FRTI comprises selecting based on the DID the first FRTI from a lookup table which comprise a plurality of FRTI.

3. The method of claim 1, wherein receiving the DID comprises determining that the DID is not provided by the fault source and receiving a preconfigured DID of a DID circuit based on a port to which the DID circuit is coupled, the port coupled to a fault channel of the fault source.

4. The method of claim 1, wherein the first reaction is a software reset and the second reaction is a hardware reset of the application core.

5. The method of claim 1, wherein determining the first FRTI comprises determining a respective FRTI from a plurality of FRTI in a look up table for each DID of a plurality of DID; and selecting from the determined FRTI and the respective DID, the first FRTI for the DID.

6. The method of claim 1, wherein the fault source is one of the application, the application core, a resource, execution environment, or the system on a chip and the safe state is a safe operation the application, application core, resource, execution environment, or system on a chip (SoC).

7. A fault collection and control system (FCCS) of an SoC, the FCCS comprising:

a reaction system;

a controller;

a domain identifier (DID) circuit arranged to output a domain identifier (DID) indicative of an application which caused a fault in a fault source of the SoC, the application executed by an application core of an SoC;

a timer circuit arranged to determine based on the DID a fault reaction handling time interval (FRTI) for a reaction to the fault, wherein the DID is provided to a multiplexer which receives from a mapping multiplexer selected by a mapping control circuit a plurality of FRTI corresponding to different DID, the plurality of FRTI associated with the reaction, and which outputs to a timer of the timer circuit the FRTI based on the provided DID;

the controller arranged to indicate to the reaction system a reaction associated with the fault; and the reaction system arranged to provide a reaction signal associated with the fault recovery;

determine whether the fault is recovered based on the reaction signal and after an FRTI timeout is indicated by a timer of the timer circuit; and provide an indication of whether a safe state is reached based on the determination;

wherein the FRTI is a first FRTI and the reaction is a first reaction; wherein the reaction system arranged to determine whether the fault is recovered or safe state is reached comprises the reaction system arranged to determine whether the safe state is reached or the fault recovered after the FRTI timeout; and wherein the reaction system arranged to provide an indication of a result of the fault recovery comprises the reaction system arranged to based on the safe state not being reached, signal a second reaction associated with the fault recovery different from the first reaction;

wherein the timer circuit is further arranged to cause by the mapping control circuit the multiplexer to receive another plurality of FRTI corresponding to the different DID, the other plurality of FRTI associated with a second reaction; select by the multiplexer based on the provided DID a second FRTI from a plurality of FRTIs associated with the second reaction and output to the timer the second FRTI of the DID;

wherein the reaction system arranged to determine whether the fault is recovered or safe state is reached further comprises the reaction system arranged to determine whether the safe state is reached or the fault recovered after a timeout of the second FRTI, wherein the first FRTI and the second FRTI are configured to reduce a time that the fault source reaches the safe state after the fault increasing functionality of the fault source after the fault compared to when the first FRTI and second FRTI do not change for different reactions; and wherein the second reaction is more severe than the first reaction.

8. The FCCS of claim 7, wherein the DID circuit is arranged to determine that the DID is not provided by a fault source and the timer circuit is arranged to receive a preconfigured DID of the DID circuit based on a port to which the DID circuit is coupled, the port coupled to a fault channel of the fault source.

9. The FCCS of claim 7, wherein the timer circuit arranged to determine the first FRTI comprises the timer circuit arranged to select based on the DID the first FRTI from a lookup table which comprise a plurality of FRTIs.

10. The FCCS of claim 7, wherein the first reaction is a software reset and the second reaction is a hardware reset of the application core.

11. The FCCS of claim 7, wherein the timer circuit arranged to determine the first FRTI comprises the timer circuit arranged to determine a respective FRTI from a plurality of FRTIs in a look up table for each DID of a plurality of DID; and select from the determined FRTI and respective DID, the first FRTI for the DID.

12. The FCCS of claim 7, wherein the fault source is one of the application, the application core, a resource, execution environment, or the system on a chip and the safe state is a safe operation the application, application core, resource, execution environment, or system on a chip (SoC).

13. The FCCS of claim 7, wherein the FCCS comprises a plurality of DID circuits and each DID circuit is coupled to a respective port of the FCCS which provides a respective DID for a respective fault source and stores a preconfigured DID for the respective port.

14. The FCCS of claim 7, wherein the FRTI for one DID is different for another DID.

* * * * *